United States Patent [19]

Holtz

[11] 4,420,319

[45] Dec. 13, 1983

[54] MUSHROOM GROWTH ENHANCERS AND METHOD FOR PREPARING SAME

[75] Inventor: R. Barry Holtz, Los Gatos, Calif.

[73] Assignee: Spawn Mate, Inc., San Jose, Calif.

[21] Appl. No.: 298,241

[22] PCT Filed: Aug. 25, 1980

[86] PCT No.: PCT/US80/01136
§ 371 Date: Aug. 9, 1981
§ 102(e) Date: Aug. 9, 1981

[87] PCT Pub. No.: WO82/00637
PCT Pub. Date: Mar. 4, 1982

[51] Int. Cl.³ .......................... C05G 3/00; A01G 1/04
[52] U.S. Cl. ........................................ 71/5; 71/64.11; 71/64.13; 71/64.06; 47/1.1
[58] Field of Search ................. 71/5, 6, 64.6, 64.11, 71/64.13; 47/1.1; 424/168, 172, 177

[56] References Cited

U.S. PATENT DOCUMENTS 3,942,969  3/1976  Carroll, Jr. et al. ................. 71/5

*Primary Examiner*—Ferris H. Lander
*Attorney, Agent, or Firm*—Thomas E. Schatzel

[57] ABSTRACT

The present invention is a process for preparing growth and nutritional enhancement additives for use with mushroom cultivation and products prepared therefrom. The process includes subprocesses for preparing an activator particle containing ingredients which help maximize growth activity in the fungus and a combination particle which includes activator particles and delayed release nutrient material which helps to sustain optimal growth. The particles produced by the process, namely the activator particle, the combination particle and a method for bringing the particles into contact with mushroom mycelia at the optimum time are also included. The invention is intended to maximize efficient, rapid and healthy growth in commercial mushroom strains.

21 Claims, 5 Drawing Figures

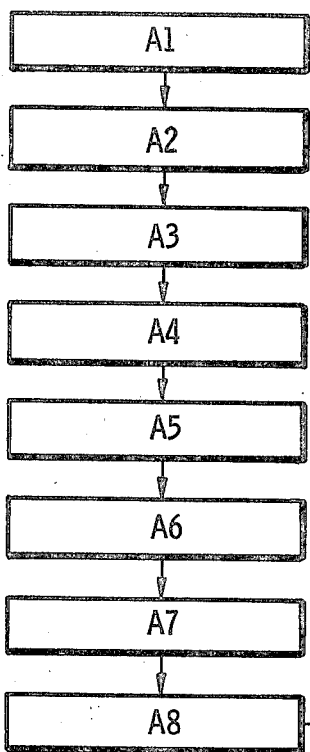
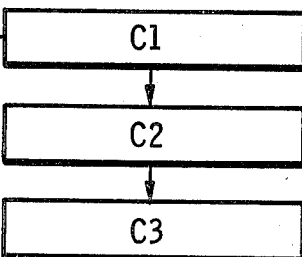
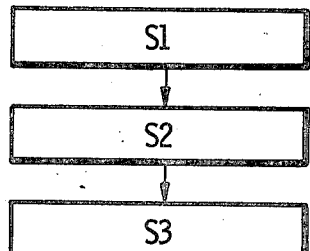
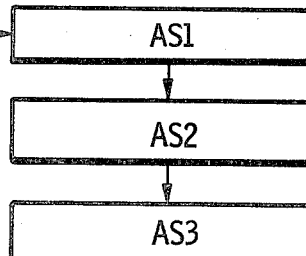
Fig_1

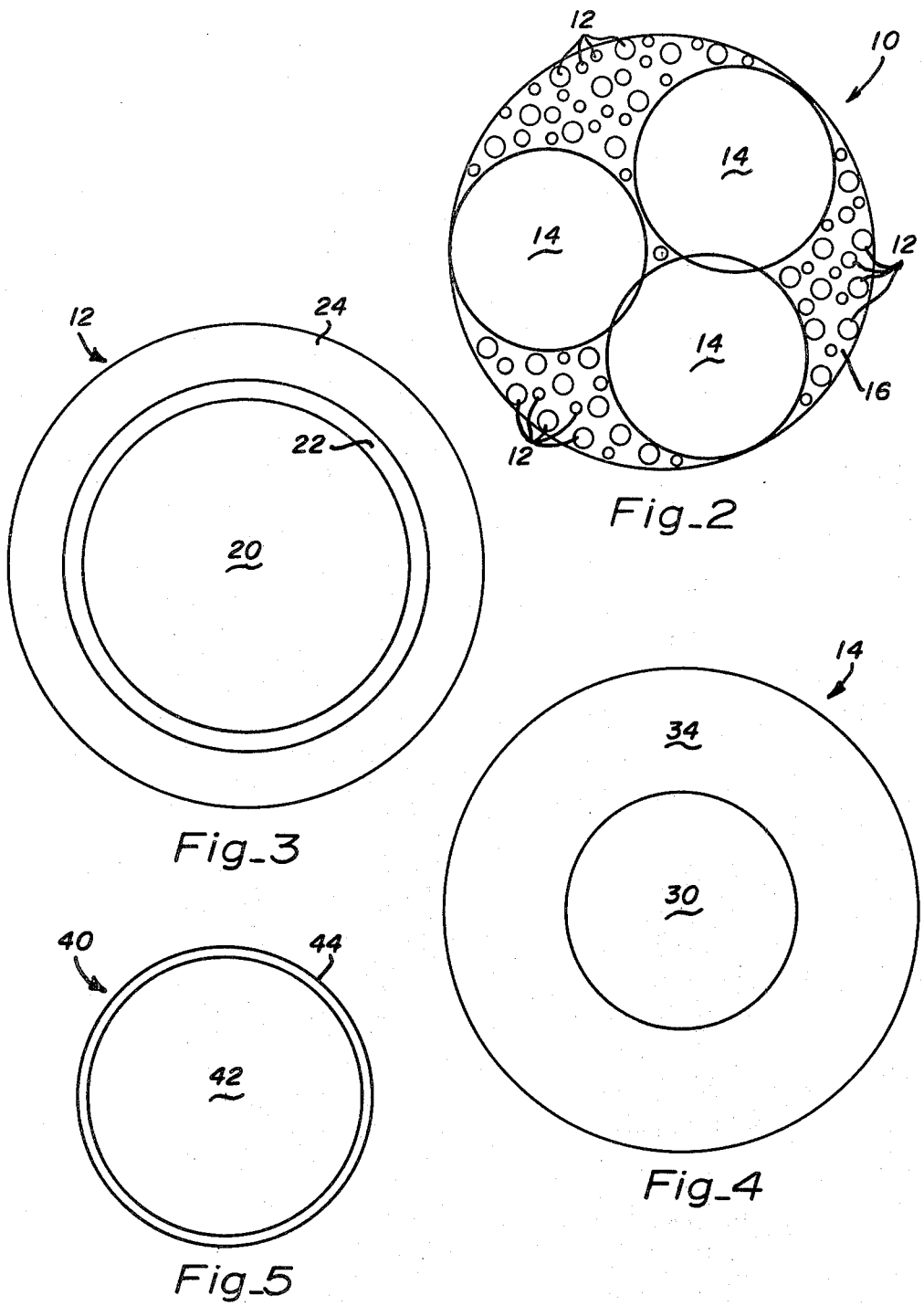

MUSHROOM GROWTH ENHANCERS AND METHOD FOR PREPARING SAME

TECHNICAL FIELD

This invention relates generally to methods for producing nutritional additives for biological systems and more particularly to processes for preparing growth inducing materials and food stuffs for use in growing mushrooms and to the products resulting from the processes.

BACKGROUND ART

"Mushroom" is a generic term which refers to a number of species of fungus, in particular those species which are edible. Mushroom growing has become a multi-billion dollar international industry in recent years. The industry has pushed hard and long to attempt to discover methods of growing bigger, more esthetically pleasing, and tastier mushrooms. It has also been a prime object of the industry to discover methods of growing these mushrooms in the shortest possible period of time and with the least incidence of diseases and failures.

A typical mushroom crop consists of a number of distinct stages. The mushroom must go through the stages of compost preparation, compost pasteurization, spawn preparation, planting, vegetative development, after which time the environment is "cased" to induce the production of fruit, and finally, fruition. The length of time required for each of these stages is dependent both upon the type of mushroom to be grown and upon the precise environmental conditions to which the mushroom spores and mycelia are exposed.

The production of the mushroom spawn for innoculation is one of the initial stages. Typically, this consists of the preparation of a large number of kernals of some member of the wheat family, preferably rye, although millet is also used. The rye kernals are sterilized and prepared and then innoculated with the mycelia of the particular species of mushroom desired, typically, in the United States, *Agaricus bisporus*. The mushroom mycelia are then allowed to proliferate upon the kernels of grain until the individual kernels are completely covered by the living mushroom tissue. The mushroom mycelia-covered kernels which result are known in the industry as "spawn".

The production of spawn is typically carried out in a commercial laboratory environment. The sources for mushroom spawn, particularly those of a specific species, are quite limited. Ordinarily, the spawn available for a particular type of mushroom will have less than fifty original sources throughout the world. Sterility and quality control in the early stages of spawn production are extremely important. Consequently, the spawn is typically produced in a laboratory then stored and shipped to the end users, the growers.

Once the grower has received the spawn he is ready to undertake the second stage of mushroom growing, the planting of the spawn. The grower has prepared, and aged to the proper stage, under proper temperature and environmental conditions, a bed of compost in which the spawn is to be planted. This compost has traditionally been the cleanings from horse stables or other similar composts, although modern composts come from a variety of sources. It is necessary to select and treat the compost carefully so that it has good nutrient content and does not contain undue amounts of acid or various chemical and biological inhibitors such as high ammonia content. High concentrations of chemicals such as acids or ammonia will hinder the growth of the mushrooms and reduce the efficiency of the operation.

The actual planting consists of distributing the spawn throughout the compost bed in such a manner that the food contained in the bed is reasonably accessible to each spawn. To achieve this, the spawn grains are typically evenly distributed over the compost surface and then mechanically mixed into the compost.

Once the spawn has been planted, it is allowed to vegetate and grow under controlled environmental conditions until it is "cased" and then continues to vegetate until the mycelia are ready for fruition. The amount of time necessary for such vegetative growth is dependent on the precise environmental conditions, the particular type of mushroom and the nutrative content of the compost bed. A typical vegetative stage extends between thirty days and thirty-six days.

After the vegetative phase has continued for the appropriate length of time, approximately twelve to sixteen days, the grower will perform an operation known as casing. Casing involves spreading a thin layer of soil over the compost bed. This soil is kept moist. The bed temperature is thus reduced for a short period. This temperature reduction has the effect of causing the mushroom mycelia to fruit or "crop" and thus send up the actual mushrooms through the casing soil.

The final stage of a mushroom crop is the actual fruition or "cropping". During this stage the mature fungus sends up the fruiting bodies which are marketed as mushrooms. Each particular colony of fungus will send up fruit when it has reached the proper stage. The actual time frame of the fruition varies throughout the bed. The fruition stage of the crop typically appears about nineteen days after casing and lasts for approximately four to five weeks.

Of the four main stages of a mushroom crop only the vegetative stage and the fruition stage are significantly affected by the addition of a nutrient additive. The duration of the spawning stage is determined primarily by the type and condition of grain used and the particular strain of mushroom mycelia innoculated onto the grain. The planting stage is of relatively short duration and can be improved only by mechanical techniques such as improved evenness of distribution of the spawn kernels. The timing of the casing affects the timing of the fruition but this operation is relatively independent of nutrients. The vegetative and fruition stages, however, and to a certain extent the later portions of the spawning stage, can be affected significantly by the addition of biological activators and nutrients to the process.

The basic methods for producing mushroom spawn have been described in a number of United States patents. These patents include U.S. Pat. No. 1,869,517 issued to J. Sinden; U.S. Pat. No. 2,005,365 issued to R. DiGiacinto; U.S. Pat. No. 2,044,861 issued to J. Sinden; and U.S. Pat. No. 3,828,470 issued to B. Stoller. Each of these references relates to the manner in which mushroom spawn is prepared for the vegetative phase.

U.S. Patents have also issued regarding the method of adding nutrients or synthetic composts to mushroom cultures to provide for improved growth characteristics. These have included U.S. Pat. No. Re. 22,202 reissued to B. Stoller; U.S. Pat. No. 3,560,190 issued to D.

Hughes, et al.; and U.S. Pat. No. 3,942,969 issued to A. Carrol, Jr., et al. Each of these patents relates to the specific content of additives to either the spawn or the compost bed. The additives and processes involved in these references are intended to increase the production of mushrooms and/or decrease the period of time necessary to grow the mushrooms under certain conditions.

The subject of mushroom growth activation has also been treated in a number of scientific articles. These include "Stimulation Of Yield In The Cultivated Mushroom Via Vegetable Oils" L. C. Schisler, APPLIED MICROBIOLOGY, July, 1967, pages 844–850; "The Lipids Of Thermophilic Fungi: Lipid Composition Comparisons Between Thermophilic and Mesophilic Fungi" R. O. Mumma, et al, LIPIDS, January, 1970, Volume 5, No. 1, pages 100–103; "Thermophilic Fungi: II." R. O. Mumma, et al., LIPIDS, Volume 6, No. 6, pages 584–588 (1971); "Thermophilic Fungi: III" R. O. Mumma, et al, LIPIDS, Volume 6, No. 8, pages 589–594 (1971); a masters thesis entitled "Studies On Lipid Metabolism Of *Agaricus Bisporus* (Lange) Sing. and Compost Lipid Composition" by David E. Smith, Ohio State University (1975); and "Lipid Metabolism Of Mushroom Mycelia" R. Barry Holtz & David E. Smith, MUSHROOM SCIENCE 10, Part 1, pages 437–444 (1979)

The various prior art methods have indeed succeeded in producing higher quality mushrooms in a shorter period of time than the older methods. However, there remains a great deal of room for improvement.

Even a small improvement may result in a substantial increase of production to a mushroom grower. For example, a shortening of the vegetative period by as little as two days will allow the grower to produce an entire extra crop in under three years. Thus, improvements in the mushroom techniques and additives are of particular commercial importance.

The prior art attempts have, in some degree, been aimed at improving the nutrient environment for the mushroom mycelia during the vegetative stage. These have included preparing more readily digestible food stuffs for the mushroom mycelia and have extended to the use of delayed release nutrients. However, none of the prior art attempts has directly attacked the phenomenon of aging within the individual mushroom cells and the concomitant slowing of metabolic membrane transport mechanisms which can effect the growth velocity.

BRIEF DESCRIPTION OF THE INVENTION

It is therefore an object of the present invention to provide a process of manufacturing additives for mushroom spawn that will induce the spawn to reach fruition in a shorter period of time than without the additives.

It is also an object of the present invention to retard and prevent premature aging of the individual fungus cells.

It is another object of the present invention to improve the membrane transport characteristics of the individual mushroom cells such that the cells grow more quickly and more vigorously.

It is yet another object of the present invention to provide an additive directly applied to mushroom spawn for providing the spawn with a readily available source of nutrition throughout its early vegetative life time.

Briefly, the present invention includes (a) a process for manufacturing a combination mushroom spawn activator and delayed release nutrient particle, (b) the combination particle manufactured thereby, (c) a precursor activator particle, and (d) a process continuation for utilizing the combination particle in conjunction with mushroom spawn. The combination particle includes a number of activator particles, each of which is made up of a droplet of easily digestible polyunsaturated oils, surrounded by a thin vitamin-surfactant layer and a microencapsulating activated protein layer, and one or more delayed release nutrient ("DRN") particles, generally made up of an oil drop encapsulated by an exterior layer of partially denatured protein.

The manufacturing process for the combination particle is a combination of a sub-process of manufacturing the activator particle and a sub-process of combining the activator particle with DRN material into the combination activator-DRN particle.

The activator particle is manufactured by the sub-process of adding the appropriate polyunsaturated oils, blending thoroughly, adding the surfactant and vitamin materials, blending again, adding the activated protein concentrate with further blending, homogenizing the mixture and spray drying the resulting particles.

A combined activator-DRN particle is then formed by the sub-process of coagglomerating an amount of the activator particle and a larger amount by weight of DRN particles materials together with a binder, drying the resultant mixture and asceptically packaging the combination.

The resulting combination activator-DRN particle may then either by added to compost for mushrooms or, by way of the continuation process, be directly brought into contact with immature spawn prior to planting.

An advantage of the present invention is that the single combination particle produced by the process, when added to the spawn or compost, can create a major increase in the efficiency of the mushroom crop.

Another advantage of the present invention is that the membrane activation substances contained in the activator particle retard premature aging of the mushroom spawn cells.

A further advantage of the present invention is that the combination particle resulting is of proper relative size so that it interfaces well with mushroom spawn to provide optimum growth conditions.

Still another advantage of the present invention is that a colony of mushroom mycelia exposed to the particles produced according to the invention will exhibit improved growth, vigor and disease resistance characteristics over unexposed mycelia.

A further advantage of the present invention is that the particles produced may nourish a spawn kernel that is planted in a relatively nutritionally barren volume of compost until the mycelia have grown sufficiently to expand beyond their immediate volume and have ability to reach more remote food sources.

Yet another advantage of the present invention is that the processes of manufacture for the various particles are simple and easily accomplished.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

FIG. 1 is a flow chart diagram of a process for manufacturing an activated spawn mixture in accordance with the present invention.

FIG. 2 is a cross-sectional view of an idealized combination activator-DRN particle;

FIG. 3 is a cross-sectional view of an idealized activator particle;

FIG. 4 is a cross-sectional view of an idealized DRN particle; and

FIG. 5 is a cross-sectional view of an idealized single cell of mushroom mycelium.

BEST MODE OF CARRYING OUT INVENTION

The present invention includes a process for manufacturing particles which are used to activate and encourage the growth of mushroom mycelia and the resulting products thereof. The process includes subprocesses for the manufacture of activator particles, the coagglomeration of the activator particles and an amount of DRN particles into a combination particle, the preparation of mushroom spawn and the addition of the combination activator-DRN particles to the mushroom spawn at a time prior to planting to promote the greatest possible activation and growth of the spawn. The entire process is illustrated in the flow chart diagram of FIG. 1.

As may be seen by the illustration of FIG. 1, the overall process of the present invention includes two subprocesses which may be carried out relatively independently. The activator particle must be created and the mushroom spawn must be grown to the appropriate growth stage for mixing with the combination particle. Therefore, these independent subprocesses may take place at various times and the overall process is not affected by the precise timing or order of these processes.

The sub-process for manufacturing the activator particle is designated in FIG. 1 by the flow chart boxes labeled A1 through A8. Steps A1 through A8 represent the various stages of the preparation of the activator particle in the presently preferred embodiment. The precise steps and the order thereof may be altered by the use of slightly different ingredients or by the variation in the times required for each step or by altering the degree of mixing involved.

Step A1 in the preparation of the activator particle is the addition, in a common container, of the necessary polyunsaturated oils to be contained in the microencapsulated oil protein particle known as the activator particle. The polyunsaturated oils utilized in the activator particle are primarily triglycerides and phospholipids. In the preferred embodiment the ratio of triglycerides to phospholipids is approximately 3.3:1.

Triglycerides are glycerol moieties esterified with three distinct fatty acid chains. The preferred triglycerides are those where each chain contains approximately eighteen carbon atoms and each chain includes two or more carbon-carbon double bonds ($C=C$), that is, the chains are "polyunsaturated".

The triglycerides utilized in the preferred embodiment are mixed species triglycerides from any of a number of fat sources. The preferable sources are soybean oil, safflower oil and cottonseed oil, as these oils are particularly high in polyunsaturated oil content. The organic fatty acids which make up the acid chains in the triglycerides contained in these oils are primarily Palmitic [Hexadecanoic acid $CH_3(CH_2)14\ COOH$], Oleic [9 Octadecenioc acid, $CH_3(CH_2)_7\ CH:CH\ (CH_2)_7\ COOH$] and Linoleic [9, 12 Octadecadienoic acid, $CH_3(CH_2)_4\ CH:CH\ CH:CH\ (CH_2)_7\ COOH$] acids. The eighteen carbon polyunsaturated fatty acids such as linoleic acid and linolenic acid [9, 12, 15 Octadecatrienoic acid, $CH_3(CH_2\ CH:CH)_3\ (CH_2)_7\ COOH$], another component of the triglycerides, are the preferred fatty acid components of the activator particle.

The phospholipids used in step A1 are obtained primarily from natural lecithin. Soybean lecithin is the primary source of the phospholipids utilized in the activator particle. It is desirable that the phospholipids utilized have a high linoleic acid content. The phospholipids which are predominant in these lecithin fractions and which are the most effective activators and surfactants are phosphatidyl choline and phosphatidyl ethanolamine.

Step A2 is the thorough blending of the polyunsaturated oil additives. Since the phospholipids and triglycerides are reasonably miscible they can ordinarily be properly blended by the use of ordinary stirring for a period of about five minutes.

In Step A3, the surfactant and vitamin membrane stabilizer material is added. In the preferred embodiment, both the surfactant and stabilization functions are accomplished by the use of a group of organic chemicals characterized as tocopherols, and preferably $\alpha$-tocopheral (vitamin E). A tocopherol solution is added to the polyunsaturated oils at a concentration of approximately 200 ppm (parts per million). The sources of the tocopherols utilized are commercially available vitamin supplements and certain natural sources including soy oil fractions, wheat germ oil, and other vegetable oil fractions. The tocopherols derived from sources other than specific commercial vitamin supplements will be of a mixed variety. Mixed tocopherols are adequate for the purposes of the invention although a pure $\alpha$-tocopherol additive may have certain superior characteristics regarding membrane activation.

In step A4 the tocopherol additive is thoroughly blended with the polyunsaturated oils. Since the tocopherol additive and the oils are not entirely miscible, it is necessary to provide agitation during the blending of these components. It has been found that five minutes of blending with agitation is adequate.

Step A5 is the step wherein the activated protein concentrate is added. The weight ratio of added protein solids to polyunsaturated oil in the resulting mixture is approximately 1.5:1.

The preferred protein concentrates for use in step A5 are water soluble proteins having at least a 92% protein level by weight. It is also preferrable that the salt content in the protein concentrate be relatively low, however, some residual calcium salts are allowable. Preferrable protein concentrates for use in the present invention are calcium caseinate, whey protein concentrates, soy protein concentrates, whey-soy protein co-precipitates and sodium caseinate. Due to the particular value of calcium to the cell membrane structure of mushroom sprawn, it is preferrable to utilize calcium caseinate.

In step A6 the protein additive is blended with the prior mixture. Since the protein is added as a solid to the liquid organic oils, it is necessary to use low speed agitation and blend the mixture thoroughly for a period of approximately fifteen minutes. At the conclusion of step A6 the various components comprise a liquid-solid suspension.

In step A7 the suspension is homogenized. The homogenization causes the suspension to be thoroughly blended such that it will not naturally separate into distinct layers in a liquid form.

Homogenation in the preferred embodiment is accomplished using a dual stage homogenization pump. This pump uses conventional homogenization valves. For the first stage of the homogenization the pressure is set at $4.4 \times 10^4$ g/cm (1500 psig) and the second stage is accomplished at a pressure setting of $1.5 \times 10^4$ g/cm (500 psig).

The final step in the manufacture of the activator particle is step A8 in which the homogenized suspension is formed into small round particles and spray dried. The spray drying step reduces the moisture content of the homogenized suspension and forms the material into microencapsulated particles.

The homogenate is spray dried in a nozzle or centrifugal atomizer dryer of standard commercial configuration. It is desirable to reduce the final moisture content of the particles in the drying step to approximately 6%. For a typical feed rate, the inlet temperature necessary to accomplish this amount of drying would be approximately 150° C. (300° F.).

After the completion of step A8, the activator particle is complete and may be used independently. The resulting particles are microencapsulated oil particles with the protein concentrate acting as the encapsulating substance. The vitamin-surfactant layer acts as a surfactant between the protein layer and the oil drop. The activator particles are approximately spherical in shape and have a diameter in the neighborhood of 200 microns ($2.0\times10^{-2}$ cm). At this point the activator particles are relatively stable and may be stored until needed.

The DRN particles may be manufactured by any of a number of known processes or may be commercially purchased. The DRN material utilized in the preferred embodiment of the invetion is a commercially available nutrient sold as "Spawn Mate III" by Spawn Mate, Inc. of San Jose, Calif. The DRN particle materials may be obtained either in the form of a heavy slurry of microencapsulated particles or in the form of particles. In either form the DRN materials are rewetted and combined with the activator particle into the combination activator-DRN particle. This combination particle is manufactured and packaging for shipment in steps C1, C2 and C3 as shown in FIG. 1.

In step C1 the product resulting from the subprocesses A1 through A8 are combined and coagglomerated with DRN particle materials. The small relatively dry spherical activator particles, which are dry are mixed in the coagglomerating apparatus with either slurried or relatively dry DRN particles. The DRN particles are ordinarily much larger than the activator particles. Although none of the particles are actually uniform in size and only an approximation is possible, a typical DRN particle will have a radius about ten times as large as the radius of an activator particle. In this storage, the weight ratio of activator particle to DRN particle is approximately 1:10. A third ingredient is also added at this stage, this ingredient being a 6% solution of modified food starch which is atomized into contact with the activator particles and the DRN particles during the coagglomeration procedure. The starch acts as a binder to hold the combination particle together. The amount of starch solution added is sufficient to bind the other particles together while the residual starch content is less than 3% per weight of the entire combination particle. Other binders may also be utilized.

The actual coagglomeration is accomplished by a standard tower type agglomeration apparatus.

The tower type agglomeration is a large vertical cylindrical tube, typically 6–10 meters (≃19–31 feet) in height and 0.9–1.7 meters (≃3–5 feet) in diameter, provided with a variable updraft. The particles are introduced into the tower at the top. This is ordinarily accomplished by a conveyor or other bulk delivery system. The updraft fan is set such that the air stream is sufficiently strong to prevent the activator particles and DRN particle materials to sink against the flow. The binder material, which is a starch solution in water, is injected into the agglomerator as a fine mist which is carried by the air currents into contact with the particles. The particles thus become wet and sticky and adhere together to form combination particles. When the weight to surface area-cross section ratio becomes sufficient through combination the particles fall through the air stream and exit the agglomerator at the bottom. The size and water content of the resulting combination particles may be adjusted by varying the speed of the updraft and the concentration and amount of the binder solution.

Alternatively, the coagglomeration step C1, may be accomplished by a blade type agglomerator. This uses a binder solution and either an air stream or mechanical mixing method to cause the individual particles to adhere together while the blade action controls the size of the resulting combination particles.

The combination particle resulting from the coagglomeration step, C1, has a water content in the range of 20% to 25% by weight. The approximately spherical resulting particles are combination particles each having a sieve profile of greater than 80%, +48 Taylor sieve mesh. Thus, the approximately spherical combination particles have diameters in the neighborhood of 500 microns ($5.0\times10^{-2}$ cm).

The step C2, the combination particles are dried. This step is intended to reduce the residual moisture content in the combination particles and to make them more usable for storage and shipping and less suseptible to contamination. A certain amount of heat denaturation, affecting the tertiary structure of the proteins, also takes place during this step. The proteins of the activator particle, being drier, having a lower specific heat per particle and being higher quality proteins, are denatured less than those of the DRN particle.

In the preferred embodiment the drying stage C2 is accomplished on a series of fluid bed driers. The particle temperatures on the first fluid bed drier are controlled to be approximately 44° C.±3° (110° F.+5°). On the second and final fluid bed drier the particle temperatures are controlled to be approximately 60° C.±3° (140° F.±5°).

After the drying step has been completed, the combination particles are dry and ready to be packaged and stored. At this stage, the particles may be directly applied to compost of mushroom spawn instead of packaging. However, if the combination particle is to be packaged or stored it should be packaged asceptically to prevent rot or contamination.

Step C3 is the asceptic packaging of the combination particle. Since the combination particle is a nutritionally desirable particle for a great number of bacteria and fungi other than the desired mushroom mycelia, it is necessary to protect the particle from contamination until it is ready to be added to the mushroom spawn. Sterilization of the particles is accomplished in step C2 wherein the drying temperatures are above the thermal death point of most contaminating organisms. However, it is necessary to make certain that the particle does not become recontaminated from the air or other environmental elements with which it comes in contact. Therefore, in step C3, it is immediately packaged in sterilized and environmentally isolated containers until it is ready for use. The preferred type of container is a hermetically sealed plastic bag. At this point, the combination particle is ready to be shipped and applied to mushroom spawn at any of a number of stages of development of the spawn.

The independent subprocesses which is necessary for the continuation portion of the overall activated spawn process is the actual preparation of the mushroom spawn itself. In FIG. 1 this subprocess is illustrated at steps S1 through S3. The actual growing of spawn is ordinarily done at a small number of central spawn producing laboratories and will not ordinarily be undertaken by the grower.

Step S1 involves preparation of a suitable growth medium for mushroom mycelia. This medium is typically made up of a large number of specially prepared kernels of the grain family, ordinarily rye or millet. The kernels are especially prepared by cooking in water in a large kettle or autoclave. A buffering agent such as calcium sulfate ($CaSO_4$) or calcium carbonate ($CaCO_3$) is typically added to counteract chemicals and conditions incurred during the cooking and sterilization procedure. The grain is then sterilized by introducing the medium into an autoclave at a temperature greater than the thermal death point of harmful bacteria. Thus, the kernels are particularly well suited for an initial growth medium for mushroom spores.

In step S2 the kernels are inoculated with the vegetative tissue of the particular variety of mushroom to be grown, most commonly *Agaricus bisporus.*

Step S3 is the initial growing of the spawn upon the grain kernels. In this step the inoculated kernels are placed in proper environmental conditions and allowed to grow for approximately 4 days. After this initial growing stage has past, the mushroom spawn has reached the stage where it is ready to be brought into contact with the combination activator-DRN particle to form the activated spawn.

The activated spawn is created when the spawn produced in steps S1 through S3 is brought into direct contact with the combination activator-DRN particle produced in steps C1 through C3. The steps utilized in producing an activated spawn ready for planting within a grower's compost bed are illustrated in FIG. 1 as steps AS1 through AS3.

Step AS1 involves the combining of the combination particles with the individual spawn-rye kernels such that the spawn is in direct contact with the combination particle. This may be accomplished by ordinary gentle mixing. The preferred method of combining the spawn with the combination particle is gentle, mechanical stirring. Since the spawn kernels are much larger than the combination activator-DRN particles, each spawn kernel will be surrounded by a large number of particles.

Step AS2 involves placing the activated spawn into optimum growing conditions and allowing it to mature for approximately eight to ten days. This growth period allows the spawn to develop to the stage where it is ready for planting. The interaction between the spawn and the combination activator-DRN particle keeps the spawn in an extremely vigorous growth phase throughout this period. The mycelia will grow and attach to and engulf neighboring combination particles such that these particles will remain in proximity to the spawn kernel, now a mushroom mycelium colony, even during the agitation of planting.

Step AS3 involves arresting the development of the spawn by refrigerating it. Under cold temperatures, the mushroom mycelia will become essentially metobolically inert and will continue to grow only at a very slow pace. In this condition the spawn may be easily shipped to its final destination and prepared for planting. When the spawn is warmed up to normal planting temperatures and placed under normal growth conditions again, it will resume growth at the same rate as it had prior to refrigeration in the normal case. The overall effect of the refrigeration is simply to slow down time for the mycelia until it is appropriate to have full growth conditions again.

FIGS. 2 through 6 illustrate idealized conceptions of the various individual particles which are created during the process of the present invention. Each of the particles formed during the process will vary greatly in shape and size but for the purposes of illustration it is convenient to think of each type of particle as being uniformly spherical in shape.

FIG. 2 illustrates the combination activator-DRN particle manufactured in accordance with the present invention. The combination activator-DRN particle is referred to by the general reference character 10.

It may be seen in FIG. 2 that the combination particle 10, as seen in an idealized cross section, is made up of a plurality of activator particles 12 and a plurality of DRN particles 14. The various individual particles 12 and 14 which make up the combination particle 10 are held in position by a binder 16.

In the actual individual combination particle 10, the ratio and arrangement of the subparticles is random. Although the weight ratio of DRN material 14 is 10:1 to activator material, due to the much greater size of the DRN particles 14, the number ratio of DRN particles 14 to activator particles 12 is approximately 1:10. Due to the efficacy of the coagglomeration step this ratio is usually reasonably maintained in the individual combination activator-DRN particles. However, the specific arrangement of the sub-particles within the combination particle 10 is totally random. Furthermore, it is unlikely that the particles actually produced by the processes of the present invention will be regularly spherical in shape. Thus, the illustrations are purely for the purposes of showing the relationship of the subcomponents of the particles and not to indicate any actual physical situation.

The binder 16 utilized in the preferred combination activator-DRN particle is a modified food starch solution added during the coagglomeration step C1. When dried, this food starch forms a nutritious adhesive holding the subparticles together.

FIG. 3 illustrates a cross-sectional view of an idealized activator particle 12 as produced in steps A1 through A8. The activator particle is made up of three distinct layers. The interior portion of the activator particle 12 is a fat droplet 20. Immediately surrounding the fat droplet 20 is a very thin vitamin-surfactant layer 22. The vitamin-surfactant layer 22 is ilustrated as being much thicker than it actually is. In the actual particle the vitamin-surfactant layer will actually constitute only a very small portion of the radius of the activator particle 12. The outer layer of the activator particle 12 is an activated protein layer 24.

Fat droplet 20 is made up of the triglycerides and phospholipids which are added in step A1 as illustrated in FIG. 1. This droplet 20 is a relatively homogeneous mixture of the long chain polyunsaturated triglycerides and the phospholipids. The preferred triglycerides have carbon chains in the range of $C_{18}$ length. The chains of the triglycerides are preferably unsaturated, being at least monounsaturated and preferrably diunsaturated fatty acids. The triglycerides are preferably made up of oleic, and linoleic acids. Linolenic acid content is desirable but difficult and expensive to maintain. The triglycerides contained within the fatty acid droplet 20 are similar in many ways to those found within the compost in which the mushroom spawn will be planted. The major difference between the triglycerides in the fat droplet 20 and the triglycerides to be found within the compost is that those within the fat droplet 20 are much more concentrated and will contain a much higher percentage of unsaturated and polyunsaturated triglycerides than will the compost. This is important because the mushroom mycelia can more easily utilize the polyunsaturated triglycerides than other long chain fatty acids.

The phospholipids contained in the fat droplet 20 are also similar to food elements which will be found in the compost into which the mushroom spawn will be deposited. These phospholipids are primarily of the type derived from lecithin. It is important that the phospholipids in fat droplet 20 contain a high linoleic acid content. The phospholipids are primarily phosphatidyl choline and phosphatidyl ethanolamine. The phospholipids contained in the activator particle are such that they are more easily nutritionally utilized by the mushroom mycelia than are those of the actual compost.

The vitamin-surfactant layer 22 immediately surrounds the fat droplet 20. The vitamin-surfactant layer is made up primarily of mixed tocopherols. α-tocopherol (commonly known as vitamin E) is a major component of the mixed tocopherols. These mixed tocopherols, derived primarily from natural sources such as soy and wheat germ oil fractions, serve the dual purposes of preventing premature aging in the mushroom mycelia cell membrane and also serve as a surfactant, or an emulsifier which maintains the spatial integrity of the fat droplet within the activator particle 12. The emulsification function of the vitamin-surfactant layer helps to encapsulate the fat droplet 20 within the activator particle 12 and to maintain a separation layer between the fat droplet 20 and the activated protein layer 24.

The activated protein layer 24 is made up primarily of very high concentration readily assimilated and utilized protein material. The preferred protein for the activated protein layer 24 is calcium-caseinate. This variety of protein is preferred because it is very easily digestible to the young mushroom mycelia and also because the calcium content is valuable as a cofactor for rapid growth of the mushroom mycelia. Other protein concentrates will also function as the activated protein layer but are less preferred. Among the protein concentrates which may be used are whey protein concentrates, soybean concentrates, sodium caceinate concentrates and whey-soy protein co-precipitates.

The activated protein layer 24 provides about 60% of the total volume of the activator particle 12. Since the activated protein layer 24 provides the outer surface of the activator particle 12 it will be the initial portion of the particle attacked by the mushroom mycelia.

FIG. 4 illustrates the DRN particle 14. In this idealized view it may be seen that the DRN particle is made up of two distinct components. These components are an oil drop 30, and a denatured protein layer 34. The greatest portion of the DRN particle is made up of denatured protein.

The oil drop 30 of the DRN particle 14 is a vegetable type oil which may be readily assimilated and digested by the mushrool cell.

The outer portion of the generally spherical typical DRN particle 14 is the denatured protein layer 34. This layer is composed of a protein concentrate which has been chemically altered such that it is difficult for a mushroom cell to quickly assimilate and utilize it. The protein in denatured protein layer 34 is partially denatured, that is, altered in its chemical and spatial structure in such a manner that it is more difficult for the mushroom mycelia to digest it. This is in direct contrast to the protein layer 24 of the activator particle 12 in which the protein is specially selected such that the cells may easily utilize it. The denatured protein layer 34 makes up the great bulk of the DRN particle 14 and forms an effective barrier between the cell and the desired oil drop 30.

FIG. 5 illustrates an idealized mushroom cell 40. In this theoretical view of an individual fungus cell, it may be seen that the cell includes an interior or cytoplasm 42 and a cell membrane 44 also known as a plasma membrane. The cytoplasm 42 composes the majority of the actual living reproducing tissue of the mushroom cell 40 while the plasma membrane 44 provides a boundary and a buffer between the outside environment and the cytoplasm 42. This plasma membrane 44 controls the flow of nutrients and other materials into and out of the cytoplasm 42. In this illustration the plasma membrane 44 is shown to be disproportionately thicker than it would be in the actual cell. An individual mushroom cell 40 is of microscopic dimensions.

INDUSTRIAL APPLICABILITY

The preferred embodiment of the present invention is intended to provide a healthy, vigorously growing mushroom spawn at the time of planting which maintains its vigorous growth throughout the vegetative phase and produces high quality mushrooms within a shorter period of time than the prior art. The activator particle 12 may be separately utilized in regard to a mushroom cell 40. These particles serve an independent function and, when used in combination with DRN materials, or when the combination particles 10 are placed in proximity to a spawn kernel particularly beneficial results are obtained regarding the mushroom growth. Each of the ingredients in the various particles have different effects on the individual mushroom cell 40 and particularly on the plasma membrane 44. The presence of these additives contained in the activator particle 12 and the DRN particle 14 have varying effects throughout the life cycle of the mushroom mycelia.

The mushroom cell 40 is the outgrowth of spores of the mushroom fungus. During the spawn producing stage, steps S1 through S3 of FIG. 1, these cells are grown, under as close to theoretically ideal conditions as feasible, on a nutrient rich medium, usually seed grain such as rye. During this stage, the mushroom colony grows in such a manner that the cells group to form filament-like threads for feeding. These filaments seek out nutrient sources and deliver nutrients to the interior cells as well as obtaining nutrients for the cells contained within the filaments. The amount and type of nutrients entering the individual cell 40 and the waste materials expelled are controlled by the plasma membrane 44. The cell cytoplasm 42 must receive all its nutrients and energy through the plasma membrane 44.

The manner in which a mushroom cell obtains nutrients is accomplished by the action of various enzymes associated with the cell upon the nutrients. Some of the enzymes cause the nutrients to be easily transferred through the plasma membrane 44. The cell is capable of manufacturing various enzymes for the specific purpose of chemically acting upon particular types of nutrient to which the cell has come in contact. When the cell contacts a particular type of nutrient, for example, a lipid, the cell will react by producing and secreting an enzyme specifically directed at lipid breakdown. Such a lipid specific enzyme is called a lipase. Different lipases exist for the various types of lipids which the cell would wish to ingest. For example, the ingredients of the fat droplet 20 in the activator particle are triglycerides and phospholipids. In order to ingest these two varieties of lipids, the cell would construct and secrete a triglyceride lipase and a phospholipase. These enzymes would specifically act upon the respective lipids to break down the lipid structure, cause the lipid to be transferable through the plasma membrane 44 and make the lipids suitable for energy release within the cytoplasm 42. In this manner, the individual cell obtains energy from its environment and grows and divides to create a larger and more vigorous mushroom fungus.

Enzymes are large protein complexes which are biosynthesized by the cells to accelerate the rates of biochemical reactions. Enzymes generally serve to catalyze reactions which are necessary or useful to the cell. Most enzymes are not stored in an intact form by the cell but are instead biosynthesized in response to specific biochemical inducements. This biosynthesis process consumes time. For example, a cell having the genetic ability to synthesize an enzyme to facilitate the breakdown of complex fats, such as a lipase to break down lipids, will not have preformed lipases stored within the cell. Instead, the cell will respond to the stimulus provided by the presence of lipids in close proximity by biosynthesizing the breakdown enzyme. The enzymes and other biochemical moieties produced in response to specific stimuli are known as inducible complexes. Once the stimulus is removed the cell resorbs the protein making up the complex and utilizes the protein for other purposes. However, if the inducible complex has already been induced and maintained by the continued presence of stimuli the cell can respond more rapidly to nutritional stimuli in its environment. Consequently, the growth rate of the individual cell can be greatly increased by the continuous exposure of the cell to certain varieties of nutrients such that it is not necessary for the cell to frequently remake or change nutrient enzymes.

One of the functions of the activator particle 12 is to activate the main nutrient reducing enzymes of the cells and to keep them activated throughout the growth period of the cells. Since these enzymes will be necessary to break down the energy sources available in the compost bed during the vegetative stage, it is highly desirable for the cells to be metabolically prepared to encounter these nutrients. Thus, the readily utilizable polyunsaturated triglycerides and phospholipids contained in the fat droplet 20 of the activator particle 12 cause the mushroom cell coming into contact with these polyunsaturated oils to construct triglyceride lipases and phospholipid lipases to ingest such polyunsaturated oils. When the cells then encounter similar energy sources within the compost, they will have the high level of the enzymes required to ingest such energy sources. The total growth time of such activated cells will be decreased by eliminating the necessity for the cells to produce the necessary enzymes after encountering the nutrient.

Besides inducing the mushroom cells to produce quantities of appropriate enzymes for maximum growth within the compost medium, the activator particle 12 has a further purpose of optimizing nutrient transfer through the plasma membrane 44 and preventing undue aging within the membrane. The materials contained in the vitamin-surfactant layer 22 and the protein layer 24 of the activator particle 12 serve this purpose.

One of the primary enzymes for transferring energy through the plasma membrane 44 is an enzyme known as an ATPase. ATP (adenosine triphosphate) is a primary energy transfer carrier in living cells. An ATPase promotes the function of this energy transport within and through the plasma membrane 44. In the mushroom cells the ATPase is such that it is activated by the presence of calcium. Thus, the presence of calcium at the plasma membrane barrier activates this enzyme and promotes the optimum level of energy transport by virtue of this enzyme. The calcium is provided by the activator particle 12 through the calcium caseinate contained in the protein layer 24. The calcium caseinate of the protein layer 24 thus not only provides a source of highly nutritive protein in the form of the caseinate but also provides a source of free calcium which activates the ATPase for maximum energy transport and most efficient cell growth.

The vitamin-surfactant layer 22 provides the chemical agents known as tocopherols which help minimize the aging and defense mechanisms of the plasma membrane 44.

As a cell grows and ages, the plasma membrane 44 is affected in a number of ways. One of the deleterious effects of aging is that the structural lipids of the membrane itself are gradually transformed from unsaturated or polyunsaturated lipids into saturated lipids. Another deleterious effect is that waste products which prevent efficient energy and nutrient transfer build up at or near the membrane. A third difficulty is that as the cell ages it will begin to activate defense mechanisms against hostile conditions in its environment. In response to such conditions as an improper pH or the presence of materials toxic to the cell, the cell will build up, near the plasma membrane 44, a group of stable fats known as ergosterols. These ergosterols lower the permeability of the membrane 44 and thus help to prevent the influx of the toxic substances into the cytoplasm. However, this decrease in permeability also lowers the influx of nutrients and consequently slows the growth rate. These conditions which appear as the cell ages can have a damaging effect upon the activity and growth rate of the mushroom spawn once it has reached the compost and is in the vegetative stage.

The tocopherols, such as $\alpha$-tocopherol (vitamin E), which make up the vitamin-surfactant layer 22 help to alleviate these problems. The structure of tocopherols is such that these chemicals will act as antioxidants and actively compete for available free radicals. Thus, in the presence of tocopherols, the concentration of free radicals is reduced. The free radical capture proclivities of the tocopherols serve to retard the aging process. The means by which the membrane 44 ages is primarily accomplished by the reduction of the polyunsaturated structural lipids of the membrane 42 to less efficient saturated structural lipids. This chemical reduction and saturation is accomplished by the free radicals in the environment. When the concentration of free radicals is limited by the presence of tocopherols the structural lipids are not attacked to the same degree and a higher concentration of polyunsaturated structural lipids is retained. It has been shown that the membrane transfer characteristics of the cell are significantly improved with polyunsaturated structural lipids as compared to saturated structural lipids.

By capturing the available free radicals which would ordinarily cause the aging of the cells, the tocopherol maintains better membrane integrity and obviates the necessity for the cell to synthesize ergosterol. Thus, the cell does not produce the blocking ergosterols which lower the membrane transfer characteristics at as rapid a rate as it would were the tocopherols not present. The net result is that the rapid growth period of the cell is extended. Since a greater portion of the cell life is thus in the condition of youthful vigorous growth, the net time to maturity or fruition of the fungus is compressed and it takes less time for the grower to obtain a mushroom crop from cells which have been so treated.

The DRN particle provides delayed release nutrition to the mushroom spawn cells. After the cells have been activated by the activator particles, they need long term nutrition to avoid falling short of the required nutritive components and decomposing the enzymes necessary to break down the triglycerides and phospholipids in the compost. Snce it would be prohibitively expensive to continuously provide the cells with the high quality nutrients contained in the activator particles, the DRN particles are also placed in close proximity to the spawn to insure maximum growth characteristics.

The oil drop 30 contained within the DRN particle 14 is a mixture of vegetable oils containing the same types of phospholipids and triglycerides as will be found in the fat droplet 20 of the activator particle. The components of the oil drop 30 need not be as high in polyunsaturated fats or as carefully controlled as to quality as those of the fat droplet but they are very similar. The action of the components of the oil drop 30 upon the mushroom mycelia are much the same as those of the fat droplet 20. By the time the mycelia have reached the stage wherein they can effectively breakdown the denatured protein layer 34 of the DRN particle 14 and penetrate to the oil drop 30, it is likely that the available activator particles 12, which the mycelia will preferentially attack, will be depleted. Thus, the triglycerides, phospholipids and other polyunsaturated fats and oils in the oil drop 30 will re-activate or continue to activate the triglyceride lipases and phospholipases of the cells and to keep the cells activated such that they will attack the oils and fats of this type to be found within the compost as well as supplying immediate growth nutrients to the cells.

The effect of the partial denaturation of the DRN particle 14 is that the protein of the denatured protein layer 34 is much less accessible to the mushroom cell for ingestion. Thus, the mushroom will selectively seek more easily absorbed energy sources such as the protein layer 24 of the activator particle before attacking the DRN particle 14. However, over the course of time the denatured protein will be broken down enzymatically. The denatured protein thus becomes partially usable as a nutrient source in time.

The purpose of the denatured protein and the DRN particle is to provide long term energy sources for the mushroom mycelia. As the cells and mycelia expand and grow, the capacity to attack the DRN particles increases. Furthermore, as time passes, the availability of easily absorbed nutrients such as the activator particle 12 is reduced. The use of the DRN particles 14 insures that an energy source which may be initially provided at the time of the planting or at the time of the activation of the spawn, will still be available at points well advanced into the vegetative stage and even into the fruition stage. Since the denatured protein layer 34 is not attacked in the initial stages of growth, it insures that high energy, rapid growth and fruition nutrients such as those contained in the oil drop 30 will still be available at the time of the late vegetative stage and the fruition stage.

By placing the combination activator-DRN particle 10 in proximity to the spawn kernel 52 at an early growth stage as in step AS1, the spawn is induced to reach an activated, vigorous growth stage and to maintain that growth throughout its life span to the fruition stage. Thus, planting or "spawning" a spawn kernel which has been surrounded by combination activator-DRN particles 10 in an activated spawn complex will result in a vigorously growing spawn provided with a ready nutrient source. The combination particles 10 will keep the spawn satisfied and vigorously growing until such time that it has reached sufficient size to profitably seek out and consume the nutrients available in the compost. Thus, the activated spawn which has an available supply of combination activator-DRN particles 14 will grow more vigorously and rapidly than ordinary spawn or spawn provided only with a DRN particle 14. This increased growth can result in a shorter vegetative period, a longer fruition period, and a greater overall production of mushrooms.

It may be seen that the activator particle 12, by itself, may be applied to mushroom mycelia to increase growth characteristics. This addition is less efficient and economical than the combination with the DRN particle but is nonetheless valuable in maintaining an activated spawn with optimal plasma membrane characteristics.

The various steps of the process for manufacturing the spawn complex may be varied slightly or selectively rearranged without affecting the result. Furthermore, the specific ingredients utilized in the process and resulting in the activator particle and the DRN particle, as well as the binders, may be altered to accomplish specific desired purposes.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method of preparing a biological activator and nutrient material for use with mushroom cultures, in steps comprising:

preparing a plurality of activator particles, said activator particles being adapted to induce enzyme synthesis within the cell and said particles being generally spherical in shape and including an inner core of at least one readily assimilable lipid material surrounded by a layer of at least one antioxidant-surfactant, said antioxidant-surfactant being adapted to slow cellular aging by inhibiting free radial formation, and microencapsulated by an outer layer of activated protein said activated protein being easily accessible to nascent mushroom mycelium;

coagglomerating an amount of the activator particles with a larger amount by weight of a delayed released nutrient material in the presence of a binding agent to form discrete combined particles of relatively small size, said delayed released nutrient material being in the form of particles, approximately one thousand times larger in size than the activator particles, and including a lipid droplet microencapsulated by a layer of partially denatured protein solids, said protein solids being less accessible to said mushroom mycelium such that said mycelium will preferentially attack the activator particles;

drying the resulting coagglomerated particles; and contacting said coagglomerated particles with mushroom spawn.

2. The method of preparing as recited in claim 1, wherein, the preparation of an activator particle includes the substeps;

A1-adding liquid lipid and fatty acid materials to a common container,

-thorough blending,

A3-adding antioxidant and surfactant materials,

A4-thorough blending,

A5-adding protein concentrate in solid form,

A6-thorough blending,

A7-homogenizing the entire mixture, and

A8-spray drying the homogenate to form small particles in which the protein concentrate microencapsulates the other ingredients.

3. The method of preparing as recited in claim 2 wherein, the liquid lipid and fatty acid materials added in substep A1 include phospholipids and triglycerides, said phospholipids including fractions from natural lecithin containing a high linoleic acid content, and said triglycerides including a significant percentage of unsaturated and polyunsaturated triglycerides.

4. The method of preparing as recited in claim 3 wherein said phospholipids primarily include phosphotidyl choline and phosphotidytl ethanolamine.

5. The method of preparing as recited in claim 2 wherein, said antioxidant materials and surfactant materials added in substep A3 are a collection of mixed tocopherols, said mixed tocopherols including as a primary component alpha tocopherol, said mixed tocopherols being added in an amount that is substantially less than the amount of said lipid and fatty acid materials added in substep A1.

6. The method of preparing as recited in claim 2 wherein said protein concentrate in solid form added in step A5 includes at least a 92% protein concentration by weight of water soluble protein.

7. The method of preparing as recited in claim 6 wherein said protein concentrate in solid form includes as a primary component a protein concentrate selected from the group consisting of calcium caseinate, whey protein concentrates, soy protein concentrates, whey-soy protein coprecipitates and sodium caseinate.

8. The method of preparing as recited in claim 6 wherein said protein concentrate is comprised primarily of calcium caseinate, said calcium component thereof being adapted to induce cellular ATPase.

9. The method of preparing as recited in claim 2 wherein said homogenizing substep, A7, includes a two step homogenization in a dual stage homogenization pump.

10. The method of preparing as recited in claim 2 wherein, said spray drying substep A8, is accomplished such that the maximum temperature of said particles during said spray drying substep does not reach a point where a significant amount of the protein concentrate is thermally denatured, and the residual moisture content of said particles is reduced to less than six percent.

11. The method of preparing as recited in claim 1 wherein the dried coagglomerated material is asceptically packaged.

12. The method of preparing as recited in claim 1 wherein the binding agent utilized in the coagglomeration step is a dilute food starch solution.

13. The method of preparing as recited in claim 1 and further including the substeps;

bringing said coagglomerated particles into close contact with partially grown mushroom spawn, vegetating said mushroom spawn in contact with said combination particles under closely controlled environmental conditions, and utilizing said spawn to grow therefrom mushroom crops.

14. The method of preparing as recited in claim 13 wherein said mushroom spawn has been innoculated onto seed grain approximately four days before being put into proximity with said coagglomerated particles.

15. A growth inducing additive for use with mushroom fungus comprising:

a small radius, approximately spherical activator particle, said activator particle being adapted to induce enzyme synthesis within the cell and having a core of high food value liquid lipids, surrounded by a thin layer of antioxidant-surfactant material, said antioxidant-surfactant material being adapted to reduce cell aging by inhibiting free radical formation, and including mixed tocopherols, which materials are in turn microencapsulated by an exterior layer of activated protein solids, said protein solids having a protein concentration in excess of ninety-two percent by weight and said protein being water soluble, and being readily utilizable by the mushroom mycelium whereby the mycelium will preferentially attack the activator particles as a food source.

16. The additive material as recited in claim 15 wherein, the liquid lipids include phospholipids, said phospholipids including fractions from natural lecithin containing a high linoleic acid content and triglycerides, said triglycerides containing a substantial percentage of unsaturated and polyunsaturated triglycerides, and said mixed tocopherols include as a primary component alpha tocopherol.

17. The additive material as recited in claim 15 wherein the protein solids include as a primary component thereof a protein concentrate selected from the group consisting of calcium caseinate, whey protein concentrates, soy protein concentrates, whey-soy protein coprecipitates and sodium caseinate.

18. The additive material as recited in claim 17 wherein said protein concentrate is comprised primarily of calcium caseinate.

19. The additive material as recited in claim 15 wherein the weight ratio of the protein concentrate to the liquid lipids is approximately 3:2 and the relative weight of the vitamin-surfactant materials is negligible.

20. A growth inducive additive for use with fungus cultures in combination particles comprising:

a plurality of activator particles, said activator particles adapted to stimulate immature mushroom mycelium and comprising a lipid core, surrounded by an antioxidant-surfactant layer, said antioxidant-surfactant layer including one or more naturally occuring tocopherols and adapted to retard cellular aging, and which is in turn microencapsulated by an activated protein outer shell, said outer shell being composed primarily of calcium caseinate;

a plurality of delayed release nutrient particles, comprising a lipid core surrounded by a shell of denatured protein, said delayed release nutrient particles being adapted to provide a long term food source to the mature mycelium; and a binding agent to hold the delayed released nutrient particles in close proximity with the activator particles, said binding agent comprising a dilute solution of food starch.

21. The growth inducing additive of claim 20 wherein the combination particles are approximately spherical in shape, with a water content of from 20% to 25% by weight and a diameter of approximately 500 microns, and contain said activator particles and said delayed release nutrient particles in a number ratio of approximately 10 to 1.

* * * * *